H. E. DOERR.
RAILWAY CAR CONSTRUCTION.
APPLICATION FILED JAN. 16, 1917.
1,245,323.
Patented Nov. 6, 1917.
2 SHEETS—SHEET 1.
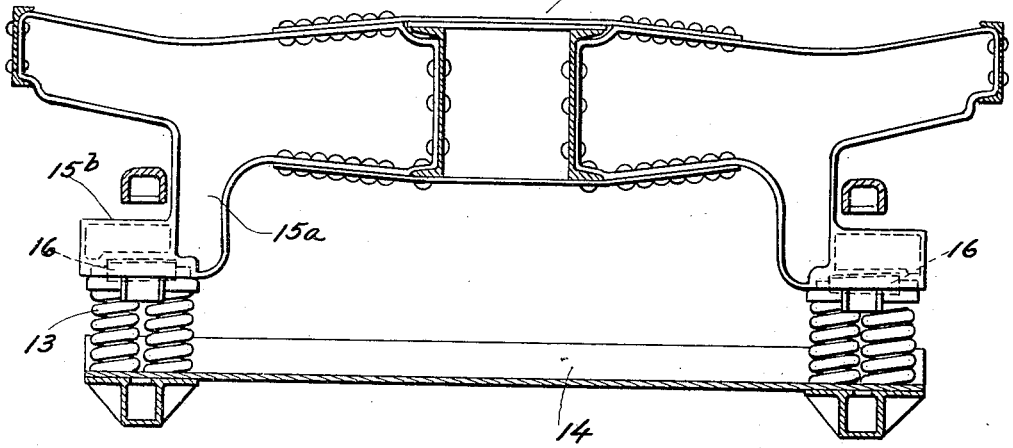
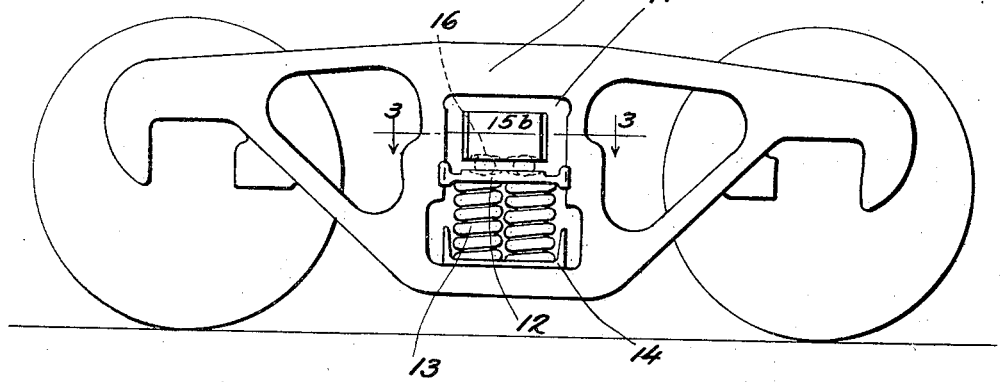
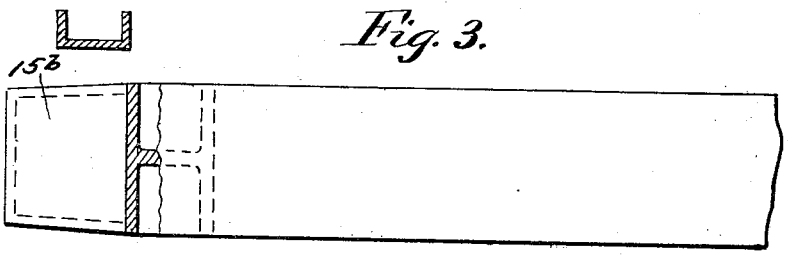
Witness:
C. C. Burnap
Inventor:
Harry E. Doerr
Sheridan, Scott & Sheridan, Attys H. E. DOERR.
RAILWAY CAR CONSTRUCTION.
APPLICATION FILED JAN. 16, 1917.
1,245,323.
Patented Nov. 6, 1917.
2 SHEETS—SHEET 2.
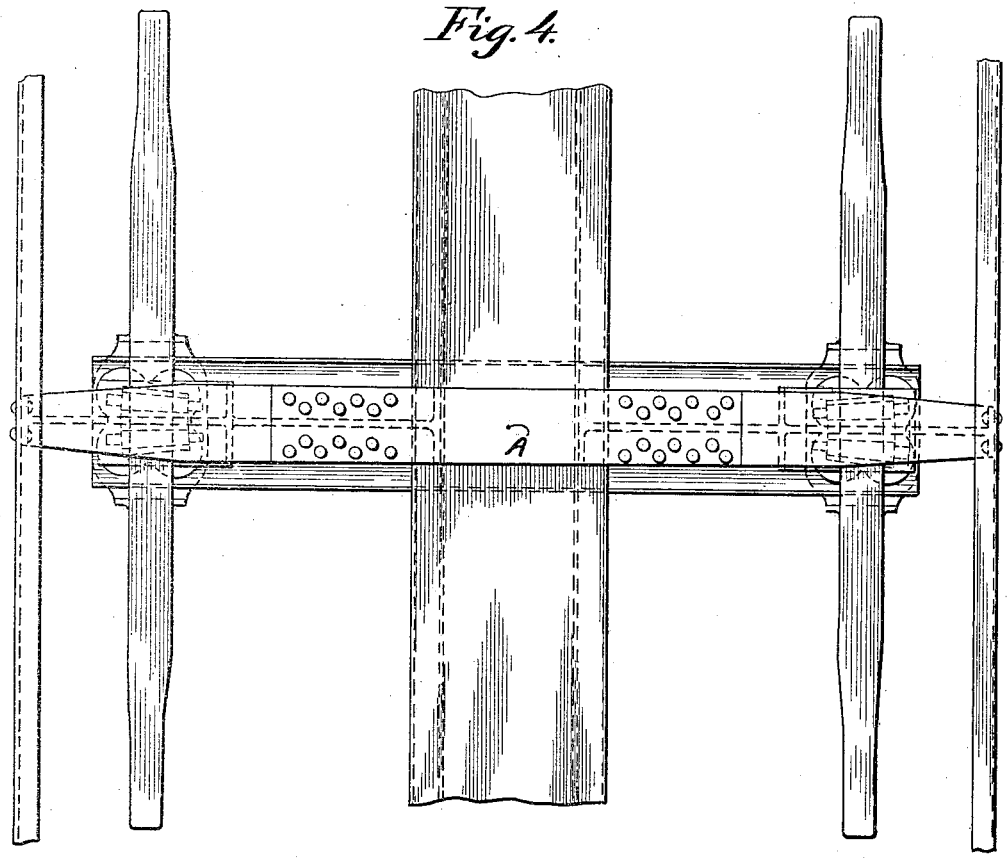
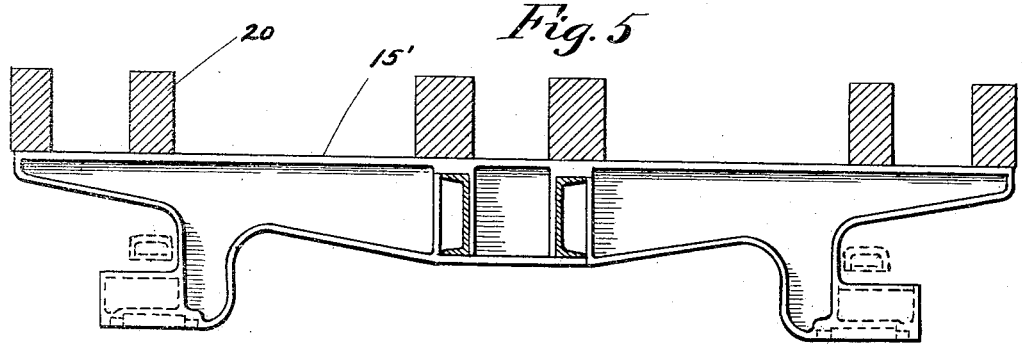
Witness:
Burnap
Inventor
Harry E. Doerr
Sheridan, Scott & Sheridan, Attys

UNITED STATES PATENT OFFICE.

HARRY E. DOERR, OF ST. LOUIS, MISSOURI, ASSIGNOR TO SCULLIN STEEL COMPANY, OF ST. LOUIS, MISSOURI, A CORPORATION OF MISSOURI.

RAILWAY-CAR CONSTRUCTION.

1,245,323.  Specification of Letters Patent.  Patented Nov. 6, 1917.

Application filed January 16, 1917. Serial No. 142,669.

*To all whom it may concern:*

Be it known that I, HARRY E. DOERR, a citizen of the United States, residing at the city of St. Louis and State of Missouri, have invented certain new and useful Improvements in Railway-Car Construction, of which the following is a specification.

This invention relates to improvements in railway car and truck frame construction, and has for its object to provide a car construction in which the truck bolster is eliminated and the weight of the car directly supported upon roller bearings, or the like, directly over the wheels on the car springs, thus enabling me to not only directly support the load of the car but to eliminate the center plate construction ordinarily required.

Still another object resides in the provision of a car directly supported over the wheels, its weight being directly borne by the truck side frame, thus eliminating the truck bolsters and center plates and at the same time providing a construction which will permit pivoting of the car trucks and wheels about the proper pivotal center.

Still another object resides in a construction permitting the direct support of a car bolster upon its truck side frame in such wise as to eliminate truck bolsters, center plates, and the like, and means being also provided to limit the side or lateral movement of the car body relative to the wheels and track. These and other objects will be more fully set forth and described in the following specification and shown in the accompanying drawings, in which—

Figure 1 is a transverse section through a car under-body showing a body bolster as mounted upon the side frame spring seats;

Fig. 2 is a side elevation of one of the side frames, showing a portion of the body bolster in assembled relation;

Fig. 3 is a section taken along the line 3—3 of Fig. 2 and drawn to an enlarged scale;

Fig. 4 is a plan view of the structure shown in Fig. 1; and

Fig. 5 is a modified form of body bolster for use in my improved construction, this being a cast form of bolster in contradistinction to the structure form shown in the other figures.

Like numerals refer to like elements throughout the drawings. 10 indicates generally a truck side frame having the aperture 11 therein, in which is guided, and in which is movably mounted, the spring plate, or seat, 12, mounted upon the usual springs 13, which are in turn supported in the channel of the cross-tie bar 14 secured to the side frame 10. The aperture 11 is that ordinarily provided in truck side frames for the insertion of the truck bolster.

The car underframe is constructed with the body bolster generally indicated by numeral 15 (see Fig. 1 for example), the same being shown in Fig. 1 as articulated in form and constructed of structural members. This body bolster is provided with downwardly projecting arms $15^a$, from which extend outwardly the wings $15^b$, these wings being inserted through the aperture 11 in the truck side frames. As shown in Fig. 2, these wings $15^b$ are supported upon tapered roller bearings 16, which in turn are supported upon the spring plates, or seats, 12, the upper side of the latter and the under side of wings $15^b$ being provided with suitable co-acting roller seats. Rollers 16 are so tapered and located that their axes continued, converge at a common center point A (see Fig. 4), this point being midway between the side-frames and in a vertical plane bisecting the adjacent sets of wheels. The purpose of this construction is to permit pivoting of the sets of wheels about the proper center point A. The sides of the wings $15^b$ are slightly tapered, as shown in Fig. 3, and the inner sides of the aperture 11 are also slightly inclined, the purpose of this construction being to insure surface contact as opposed to line contact when pivotal movement of the truck side frames takes place relative to the car body, the inner sides of the aperture 11 serving to limit the pivotal movement of the trucks. It will be noted, as shown in Fig. 1, that the depending arms $15^a$ are spaced a slight distance from the inner side of truck side frames 10, the latter permitting only the necessary amount of lateral movement of the car when such lateral movement takes place, or tends to take place.

In Fig. 5, I have shown a structure identical in function with that shown in the other figures save that the body bolster 15' is cast, the sills 20 of the car being shown as supported thereon and as constructed of wood.

By the use of my construction, it will be seen that by providing my improved form of body bolster, I am enabled to absolutely eliminate the truck bolster, center plates and similar structure heretofore used in car construction, thereby very appreciably decreasing the weight of the cars and consequent expense of construction. At the same time in adapting my structure to cars in present use, it is only necessary to remove the truck bolster and substitute my improved body bolster, the same being capable of use with the ordinary present day form of truck side frame. This is a great advantage in equipping cars already in use, since the expense of changing them is not prohibitive, and at the same time my construction provides for the proper pivotal movement of the trucks when the car is rounding a curve, or the like.

It will be obvious that my invention is susceptible of many modifications and improvements, and I do not wish to be restricted to the form shown except as defined in the appended claims.

What I claim is:

1. In combination, truck side frames having openings, and a car body bolster member extending into said openings and being supported upon said frames.

2. In combination, truck side frames, a car body bolster member directly supported upon said frames, and separate bearing means movable both with respect to the side frames and bolster member and supporting said bolster member, said last-named means being constructed and arranged to permit rotation of co-acting pairs of truck frames to pivot about a center point intermediate said frames.

3. In combination, truck side frames having apertures therethrough, and a car body bolster member having winged portions extending through said apertures and carried by said side frames.

4. In combination, truck side frames having apertures therethrough, a car body bolster member having winged portions extending through said apertures and carried by said side frames, and means to permit relative movement of said side frames with respect to said winged portions of said bolster member.

5. In combination, truck side frames having apertures therethrough, a car body bolster member having winged portions extending through said apertures and carried by said side frames, and means to permit relative movement of said side frames with respect to said winged portions of said bolster member, said means comprising bearing members.

6. In combination, truck side frames having apertures therethrough, a car body bolster member having winged portions extending through said apertures and carried by said side frames, and means to permit relative movement of said side frames with respect to said winged portions of said bolster member, said means comprising tapered roller bearing members.

7. In combination, truck side frames having apertures therethrough, spring members carried by said side frames, supporting plates movably mounted in said apertures upon said springs, and a body bolster member having portions thereof extending through said apertures and supported upon said plate members.

8. In combination, truck side frames having apertures therethrough, spring members carried by said side frames, supporting plates movably mounted in said apertures upon said springs, a body bolster member having portions thereof extending through said apertures and supported upon said plate members, and bearing members located between said plate members and said bolster portion.

9. In combination, truck side frames, and a body bolster member directly supported upon and carried by said side frames, said side frames being arranged to limit the lateral movement of, and receive the side thrust of, said bolster member.

10. In combination, truck side frames having apertures therethrough, and a body bolster having portions extending through said apertures and carried by said frames, said apertures and bolster portion being so constructed and arranged as to permit necessary relative movement of said side frame with respect to said bolster member.

11. In combination, truck side frames having apertures therethrough, and a body bolster member having depending arms, said arms being provided with projecting wings, said wings being inserted through said apertures in said side frames and carried by said side frames.

12. In combination, truck side frames having apertures therethrough, and a body bolster member having depending arms, said arms being provided with projecting wings, said wings being inserted through said apertures in said side frames and carried by said side frames, said bolster arms being located adjacent to, but slightly spaced from, said side frames to permit a slight relative movement with respect to the same.

13. In combination, truck side frames having apertures therethrough, and a body bolster member having depending arms, said arms being provided with projecting wings, said wings being inserted through said apertures in said side frames and carried by said side frames, said bolster arms being located adjacent to, but slightly spaced from said side frames to permit a slight relative movement with respect to the same, said winged portions being constructed smaller than said side frame apertures to permit pivotal movement of said truck frames with respect to said bolster member.

In testimony whereof, I have subscribed my name.

HARRY E. DOERR.

Witnesses:
    HARRY DREIBUSS,
    CHAS. P. GORMAN.

Copies of this patent may be obtained for five cents each, by addressing the "Commissioner of Patents, Washington, D. C."